US007898756B1

(12) United States Patent
Wang

(10) Patent No.: US 7,898,756 B1
(45) Date of Patent: Mar. 1, 2011

(54) DISK DRIVE ADAPTING TARGET VALUES OF A SEQUENCE DETECTOR RELATIVE TO BIT ERROR RATE OF THE SEQUENCE DETECTOR

(75) Inventor: Alvin J. Wang, Fremont, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 198 days.

(21) Appl. No.: 12/178,474

(22) Filed: Jul. 23, 2008

(51) Int. Cl.
G11B 5/09 (2006.01)

(52) U.S. Cl. .............................. 360/41; 360/65; 360/39

(58) Field of Classification Search ........................ None
See application file for complete search history.

(56) References Cited

U.S. PATENT DOCUMENTS

| 5,784,415 | A  | 7/1998  | Chevillat et al. |
| 5,809,080 | A  | 9/1998  | Karabed et al.   |
| 6,185,175 | B1 | 2/2001  | Zook             |
| 6,600,617 | B1 | 7/2003  | Zeng             |
| 7,155,660 | B1 | 12/2006 | Burd             |
| 7,184,237 | B2 | 2/2007  | Shi              |
| 7,191,083 | B2 | 3/2007  | Ashley et al.    |
| 7,194,674 | B2 | 3/2007  | Okumura et al.   |
| 7,746,970 | B2 | 6/2010  | Mergen et al.    |
| 2007/0076826 | A1 | 4/2007 | Stockmanns et al. |
| 2007/0201585 | A1 | 8/2007 | Feng              |
| 2008/0007854 | A1 | 1/2008 | Lin et al.        |

OTHER PUBLICATIONS

Office Action dated Mar. 29, 2010 from U.S. Appl. No. 12/178,430, 10 pages.
Office Action dated Aug. 25, 2010 from U.S. Appl. No. 12/178,430, 12 pages.

*Primary Examiner*—Jason C Olson

(57) ABSTRACT

A disk drive is disclosed comprising a disk and a head actuated radially over the disk, wherein the head generates a read signal. A sampling device samples the read signal to generate a sequence of read signal samples when reading a training data sequence recorded on the disk, and an equalizer comprising a plurality of coefficients equalizes the read signal samples to generate a sequence of equalized samples. A sequence detector detects an estimated data sequence from the equalized samples, wherein the sequence detector operates according to a target response comprising a plurality of target values. Control circuitry adapts the target values by computing error values in response to a difference between expected samples and the equalized samples, computing a gradient in response to a correlation of the training data sequence with the error values, and adjusting at least one of the target values in response to the gradient.

14 Claims, 3 Drawing Sheets

US 7,898,756 B1

DISK DRIVE ADAPTING TARGET VALUES OF A SEQUENCE DETECTOR RELATIVE TO BIT ERROR RATE OF THE SEQUENCE DETECTOR

BACKGROUND

Description of the Related Art

Disk drives comprise a read channel for processing the read signal emanating from the head in order to demodulate the data recorded on the disk surface. The read channel typically comprises a sampling device for sampling the read signal to generate a sequence of read signal samples, an equalizer comprising a plurality of coefficients for equalizing the read signal samples to generate a sequence of equalized samples, and a sequence detector for detecting an estimated data sequence from the equalized samples according to a target response. Any suitable target response may be employed, such as a suitable partial response (e.g., PR4, EPR4, etc.), and any suitable sequence detector may be employed (e.g., Viterbi, Turbo Decoder, etc.).

The accuracy of the sequence detector is affected by how well the read channel of the disk drive can be equalized to match the target response. Since the equalizer will correlate the noise in the read signal, the preferred response requires minimal equalization by the equalizer. There is, therefore, a need to optimize the target response of a sequence detector employed in a disk drive.

DETAILED DESCRIPTION OF EMBODIMENTS OF THE INVENTION

Figure 1:
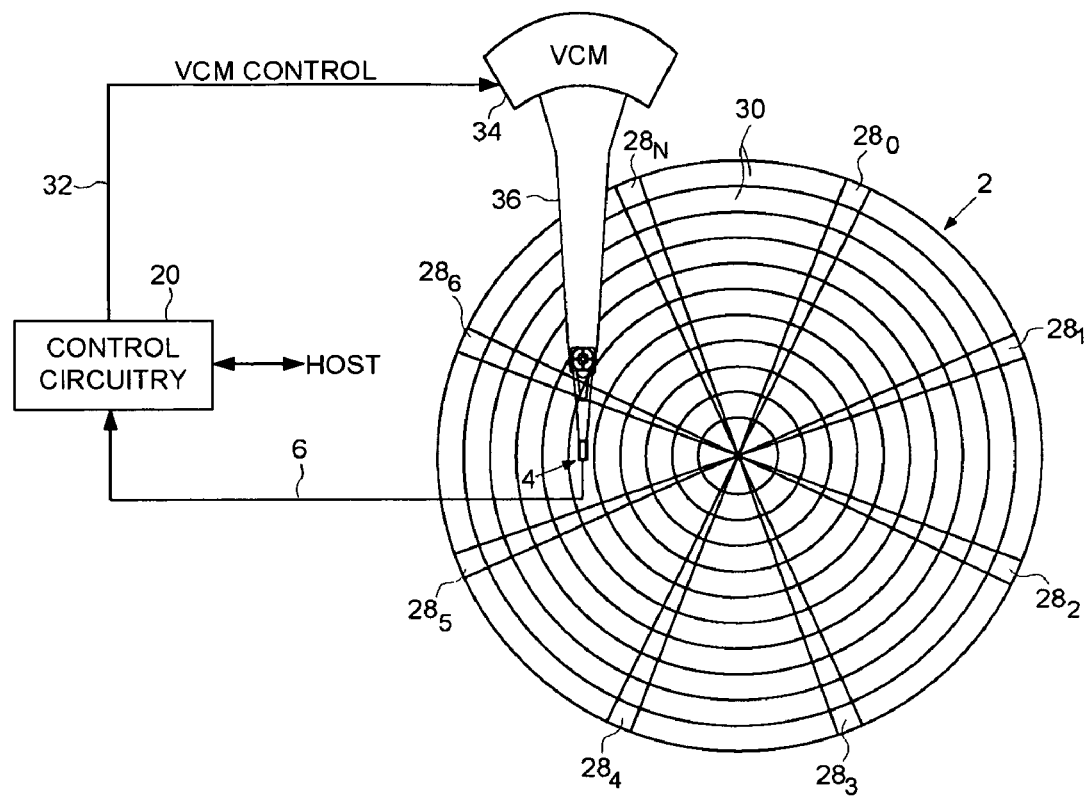
FIG. 1 shows a disk drive according to an embodiment of the present invention comprising a disk, a head actuated over the disk, and control circuitry.

FIG. 1 shows a disk drive according to an embodiment of the present invention comprising a disk 2 and a head 4 actuated radially over the disk 2, wherein the head generates a read signal 6. A sampling device 8 (FIG. 2) samples the read signal 6 to generate a sequence of read signal samples 10 when reading a training data sequence 11 recorded on the disk, and an equalizer 12 comprising a plurality of coefficients equalizes the read signal 10 samples to generate a sequence of equalized samples 14. A sequence detector 16 detects an estimated data sequence 18 from the equalized samples 14, wherein the sequence detector 16 operates according to a target response comprising a plurality of target values. Control circuitry 20 adapts the target values by computing error values 22 in response to a difference between expected samples 24 and the equalized samples 14, computing a gradient 26A in response to a correlation of the training data sequence 11 with the error values 22, and adjusting at least one of the target values in response to the gradient 26A. In one embodiment, the control circuitry 20 also adapts the equalizer coefficients by computing a gradient 26B in response to a correlation of the read signal samples with the error values 22, and adjusting at least one of the equalizer coefficients in response to the gradient 26B. In one embodiment, each of the gradients 26A and 26B is computed by scaling the corresponding correlation with at least one of the target values of the target response.

In the embodiment of FIG. 1A, the disk 2 comprises a plurality of embedded servo sectors $28_0$-$28_N$ which define a number of data tracks 30. Each servo sector 28 comprising coarse head positioning information (e.g., a track address) and fine head positioning information (e.g., servo bursts). The control circuitry 20 processes the read signal 6 to demodulate the servo sectors $28_0$-$28_N$ into a position error signal representing an error between a current radial location of the head 4 and a target radial location. The control circuitry 20 filters the position error signal with a suitable compensation filter to generate a control signal 32 applied to a voice coil motor (VCM) 34 which rotates an actuator arm 36 about a pivot in a direction that reduces the position error signal.

Any suitable sequence detector 16 may be employed in the embodiments of the present invention, such as a suitable Viterbi detector. In addition, the sequence detector 16 may operate according any suitable target response, such as a partial response (e.g., PR4, EPR4, EEPR4, etc.). The target values of the target response may be characterized by a suitable polynomial (e.g., $1-D^2$ for a PR4 response), wherein the coefficients of the polynomial may comprise any suitable values, including fractional values. In one embodiment, the target response may be configured initially according to a conventional polynomial (e.g., PR4), and then the coefficients of the polynomial are adapted (i.e., the target values of the target response are adapted) in a manner that minimizes a bit error rate of the sequence detector 16 as described below.

In one embodiment when simultaneously adapting the target values of the target response and the coefficients of the equalizer 12, the expected samples 24 are generated by convolving the training data sequence 11 with an ideal polynomial representation of the channel. The training data sequence may be prerecorded on the disk (e.g., using an external servo writer or stamping technique) or it may be written to the disk by the control circuitry 20. In another embodiment when adapting only the coefficients of the equalizer 12, the expected samples 24 may be generated by convolving the estimated data sequence 18 with an ideal polynomial representation of the channel. For example, in one embodiment the target values of the target response and the coefficients of the equalizer 12 may be adapted simultaneously during a calibration procedure using a training data sequence. Once the target values of the target response have converged, the target values remain static during normal operation of the disk drive (i.e., while reading user data) and the coefficients of the equalizer 12 may continue to be adapted by generating the expected samples 24 in response to the estimated data sequence 18.

In one embodiment of the present invention, the coefficients of the equalizer 12 and the target values of the target response are adapted by computing a gradient that attempts to minimize the bit error rate of the sequence detector 16. For example, in the embodiment wherein the sequence detector comprises a Viterbi detector, an error event occurs when:

$$\sum_k (y_k - d_k^i)^2 < \sum_k (y_k - d_k)^2$$

where $y_k$ represents a sequence of equalized sample values, $d_k$ represents the correct sequence of expected sample values, and $d_k^i$ represents an alternative sequence of expected sample values. Therefore, the probability of a Viterbi detector making an error in the presence of an error event $e_a^i$ can be represented as:

$$Pr(eer^i | e_a^i) = Pr\left\{\sum_k (y_k - d_k^i)^2 < \sum_k (y_k - d_k)^2\right\}.$$

The above equation for representing an error event can be expanded into:

$$\sum_k \left[(d_k^i)^2 - (d_k)^2 - 2y_k(d_k^i - d_k)^2\right] < 0.$$

Letting $y_k = d_k + z_k$ where $z_k$ consists of statistical noise and residual intersymbol interference (ISI). Also let $d_k^i = (a^i * g)_k$ and $d_k = (a * g)_k$ where $a$ is a NRZ input sequence and $g$ represents the target values of the target response. With $a_k^i - a_k = 2 \cdot e_{ak}^i$, the above equation for representing an error event can be represented as:

$$\sum_k [(e_a^i * g)_k]^2 - \sum_k (e_a^i * g)_k \cdot z_k < 0.$$

Letting $e_{yk}^i = (e_a^i * g)_k$ the above equation can be written as:

$$\sum_k [e_{yk}^i]^2 - \sum_k e_{yk}^i \cdot z_k < 0.$$

Observe $z_k$ is a statistic quantity consisting of residual ISI and statistical colored noise. Assume the summation in the above equation accounts for N consecutive samples during the error event observation window, then the error-making condition becomes:

$$\sum_{k=0}^{N-1} [e_{yk}^i]^2 - \sum_{k=0}^{N-1} e_{yk}^i \cdot z_k < 0.$$

Define column vectors:

$$e_y^i = [e_{y0}^i e_{y1}^i L e_{yN-1}^i]^T \text{ and } z = [z_0 z_1 L z_{N-1}]^T$$

then the above equation becomes:

$$e_y^{iT} e_y^i - e_y^{iT} z < 0.$$

Observe that $e_y^{iT} e_y^i - e_y^{iT} z$ is a Gaussian stochastic variable with mean value $M = e_y^{iT} e_y^i$ and variance $V = e_y^{iT} E\{zz^T\} e_y^i$. Thus we can use the Q function:

$$Q(x) = \frac{1}{\sqrt{2\pi}} \int_x^\infty e^{-u^2/2} du$$

to write the error event probability equation as:

$$Pr\{e_y^{iT} e_y^i - e_y^{iT} z < 0\} = Q\left(\frac{e_y^{iT} e_y^i}{\sqrt{e_y^{iT} E\{zz^T\} e_y^i}}\right).$$

Defining $R^z = E\{zz^T\}$ and the Viterbi pre-detection effective signal-to-noise ratio as $\rho = M^2/V$ the error event probability equation can be written as:

$$Pr(eer^i | e_a^i) = Q(\rho_i) = Q(M/\sqrt{V})$$

where:

$$\rho_i = \frac{e_y^{iT} e_y^i}{\sqrt{e_y^{iT} R^z e_y^i}}$$

For error event $e_{ak}^i$ with number $\lambda^i$ of error bits in the pattern, the bit error occurrence probability is:

$$Pr(e_a^i) = 2^{1-\lambda^i} \cdot \lambda^i.$$

Consider $\kappa + 1$ number of dominant error events of $e_{ak}^i$, the error event probability equation can be approximated as $$\sum_{i=0}^{K} Pr(eer^i | e_a^i) Pr(e_a^i) = \sum_{i=0}^{K} Q\left(\frac{e_y^{iT} e_y^i}{\sqrt{e_y^{iT} R^z e_y^i}}\right) 2^{1-\lambda^i} \lambda^i = \sum_{i=0}^{K} Q(\rho_i) 2^{1-\lambda^i} \lambda^i.$$

From the above equation, the higher $\rho_i$ the lower the probability of error. For a specific error event $e_{ak}^i$, maximizing $\rho_i$ means minimizing:

$$E = e_y^{iT} R^z e_y^i.$$

In one embodiment, the coefficients of the equalizer 12 and the target values of the target response are adapted in response to a gradient that minimizes the above E. Consider an example embodiment wherein the read channel comprises the dominant error events +, +−, +−+ and +0+, and the target response comprises the target values $g = [g_0 \ g_1 \ g_2]^T$, then the error event contributor $e_y^i$ to E can be represented in the following table:

TABLE 1

| $e_{ak}^i$ | $e_y^i = [e_{yk}^i = (e_a^i * g)]$ |
|---|---|
| + | $[g_0, g_1, g_2]^T$ |
| +− | $[g_0, g_1 - g_0, g_2 - g_1, -g_2]^T$ |

TABLE 1-continued

| $e_{ak}{}^i$ | $e_y{}^i = [e_{y,k}{}^i = (e_a{}^i * g)]$ |
|---|---|
| +−+ | $[g_0, g_1 - g_0, g_2 - g_1 + g_0, -g_2 + g_1, -g_2]^T$ |
| +0+ | $[g_0, g_1, g_2 + g0, g0, g_2]^T$ |

The noise correlation matrix $R^z$ can be written as:

$$R^z = \begin{bmatrix} e_k e_k & e_k e_{k-1} & e_k e_{k-2} & L \\ e_k e_{k-1} & e_{k-1} e_{k-1} & e_{k-1} e_{k-2} & L \\ e_k e_{k-2} & e_{k-1} e_{k-2} & e_{k-2} e_{k-2} & L \\ L & L & L & L \end{bmatrix}.$$

Using the above equations, it is possible to compute the gradient for each error event that minimizes E. For example, for the '+' error event, E is computed as:

$$E = [g_0 \ g_1 \ g_2] \begin{bmatrix} e_k e_k & e_k e_{k-1} & e_k e_{k-2} \\ e_k e_{k-1} & e_{k-1} e_{k-1} & e_{k-1} e_{k-2} \\ e_k e_{k-2} & e_{k-1} e_{k-2} & e_{k-2} e_{k-2} \end{bmatrix} \begin{bmatrix} g_0 \\ g_1 \\ g_2 \end{bmatrix} = \sum_{i=0}^{2} \sum_{j=0}^{2} g_i g_j e_{k-i} e_{k-j}.$$

Computing $$\frac{\partial E}{\partial w_m}$$

as the adaptation gradient $\Delta_{wm}$ for the $w_m$ coefficient:

$$\Delta_{wm} = \frac{\partial E}{\partial w_m} = \sum_{i=0}^{2} \sum_{j=0}^{2} g_i g_j \left( e_{k-i} \frac{\partial e_{k-j}}{\partial w_m} + \frac{\partial e_{k-i}}{\partial w_m} e_{k-j} \right).$$

The above equation can be rewritten as:

$$\Delta_{wm} = \sum_{i=0}^{2} \sum_{j=0}^{2} g_i g_j (e_{k-i} x_{k-m-j} + e_{k-j} x_{k-m-i}).$$

Therefore, in one embodiment, the $w_m$ coefficient is updated according to:

$$w_m(k+1) = w_m(k) - \mu \cdot \sum_{i=0}^{2} \sum_{j=0}^{2} g_i g_j (e_{k-i} x_{k-m-j} + e_{k-j} x_{k-m-i})$$

where m=0, 1, 2, L, N−1 and μ is the update gain.

Computing $$\frac{\partial E}{\partial g_n}$$

as the adaptation gradient $\Delta_{gn}$ for the $g_n$ target value of the target response:

$$\Delta_{gn} = \frac{\partial E}{\partial g_n} = 2 e_{k-n} \sum_{i=0}^{2} g_i e_{k-i} - 2 \sum_{i=0}^{2} \sum_{j=0}^{2} g_i g_j e_{k-i} a_{k-j-n}.$$

Therefore, in one embodiment, the $g_n$ target value of the target response is updated according to:

$$g_n(k+1) = g_n(k) - \eta \cdot \left( e_{k-n} \sum_{i=0}^{2} g_i e_{k-i} - \sum_{i=0}^{2} \sum_{j=0}^{2} g_i g_j e_{k-i} a_{k-j-n} \right)$$

where n=1, 2 and η is the update gain, and $a_k$ is a training data sequence.

Figure 2:
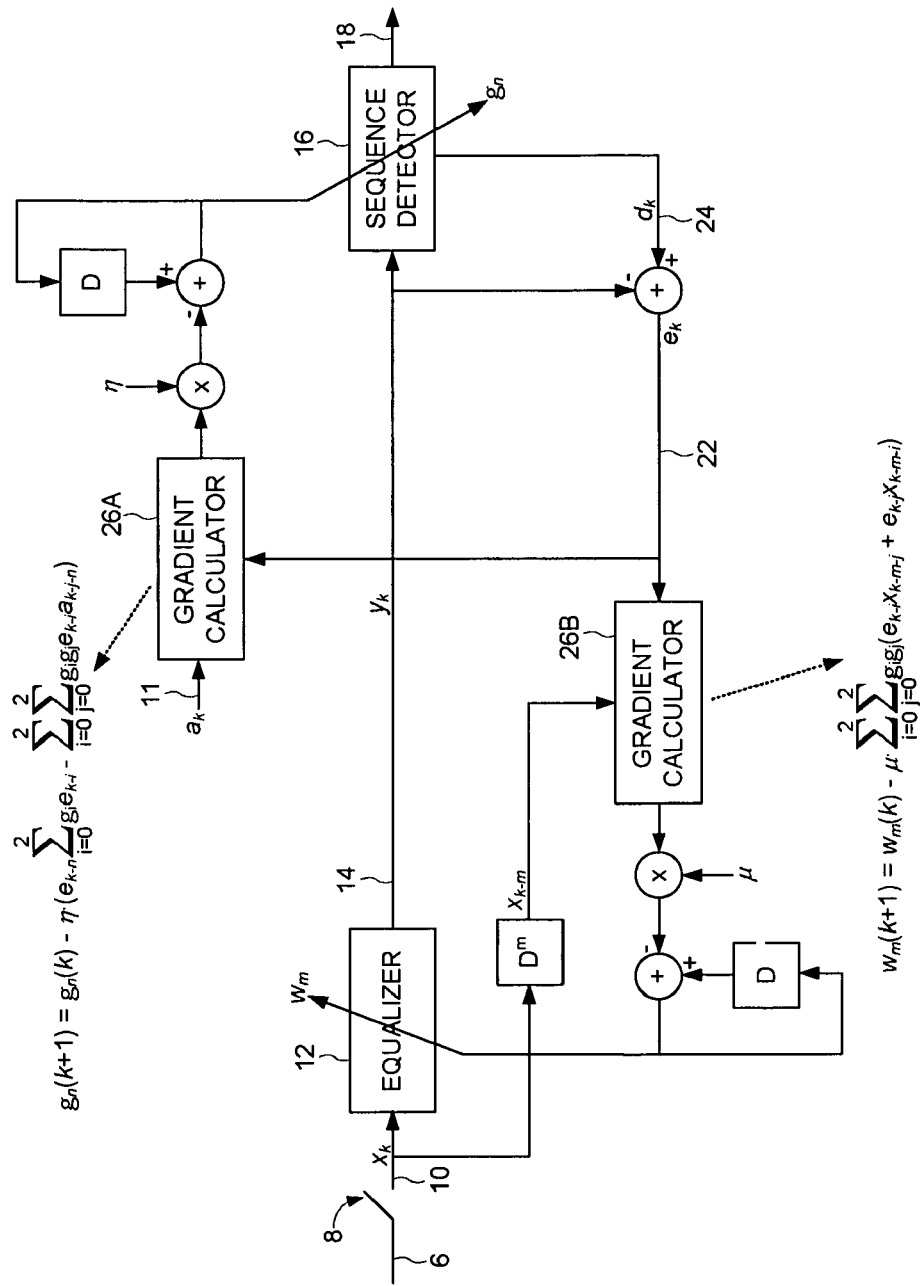
FIG. 2 shows control circuitry according to an embodiment of the present invention including a gradient calculator for computing an equalizer adapting gradient in response to a correlation of a training data sequence with error values.

FIG. 2 illustrates example circuitry for implementing the above equation for the '+' error event when the target response comprises three target values $g = [g_0 \ g_1 \ g_2]^T$. However, the above equations and corresponding circuitry can be generated for any number of target values of a target response and for any error event.

In one embodiment, the sign of the error values are used to compute the gradient in order to simplify the circuitry. In the above example for updating the $w_m$ coefficient for the '+' error event, the above equation can be written as:

$$\Delta_{wm} = \sum_{i=0}^{2} \sum_{j=0}^{2} g_i g_j (\text{sign}(e_{k-i}) x_{k-m-j} + \text{sign}(e_{k-j}) x_{k-m-i})$$

or equivalently:

$$\Delta_{wm} = 2 g_0^2 x_{k-m} + 2 g_1^2 x_{k-m-1} + 2 g_2^2 x_{k-m-2} +$$
$$x_{k-m} \cdot [g_0 g_1 \cdot \text{sign}(e_{k-1}) + g_0 g_2 \cdot \text{sign}(e_{k-2})] +$$
$$x_{k-m-1} \cdot [g_0 g_1 \cdot \text{sign}(e_k) + g_0 g_2 \cdot \text{sign}(e_{k-2})] +$$
$$x_{k-m-2} \cdot [g_0 g_2 \cdot \text{sign}(e_k) + g_1 g_2 \cdot \text{sign}(e_{k-1})].$$

Figure 3:
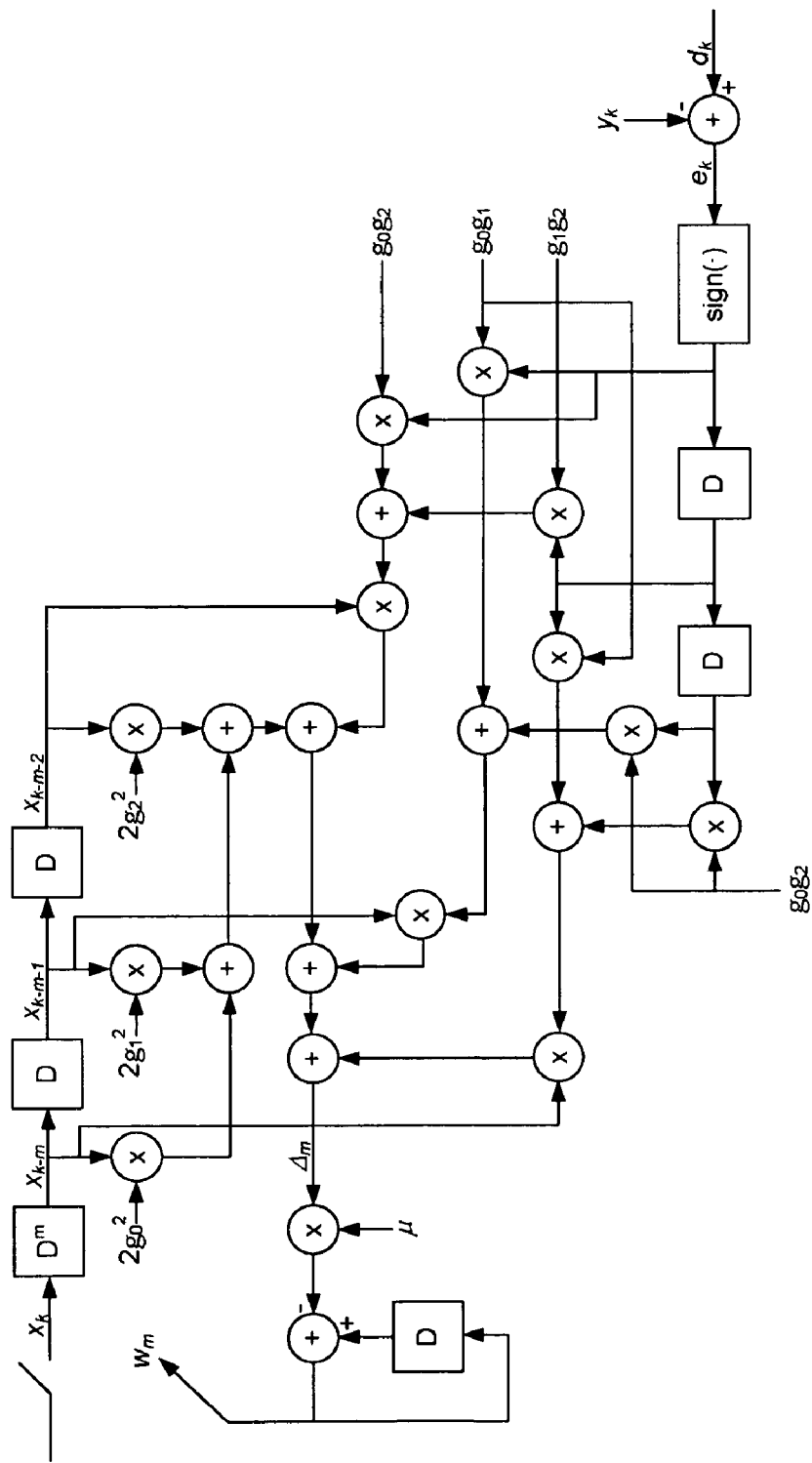
FIG. 3 shows control circuitry according to an embodiment of the present invention for computing the gradient in response to a sign of the error values.

FIG. 3 shows example circuitry for implementing the above equation, wherein similar circuitry may be employed for other error events and/or other number of target values in the target response. A similar reduction in circuit complexity can be achieved for computing the update gradient for the target values $g_n$.

In one embodiment, both the equalizer coefficients $w_m$ and the target values $g_n$ of the target response are adapted simultaneously, and in one embodiment, at least one of the equalizer coefficients and/or at least one of the target values is not adapted in order to minimize interaction between the two, thereby helping ensure the equalizer coefficients and target values converge. For example, in one embodiment the middle or main coefficient of the equalizer 12 is not adapted and/or the first target value of the target response is not adapted.

Any suitable control circuitry may be employed to implement the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
a disk;
a head actuated radially over the disk, the head operable to generate a read signal when reading a training data sequence recorded on the disk;
a sampling device operable to sample the read signal to generate a sequence of read signal samples;
an equalizer comprising a plurality of coefficients, the equalizer operable to equalize the read signal samples to generate a sequence of equalized samples;
a sequence detector for detecting an estimated data sequence from the equalized samples, wherein the sequence detector operates according to a target response comprising a plurality of target values; and
control circuitry operable to adapt the target values by:
computing error values in response to a difference between expected samples and the equalized samples;
computing a gradient in response to a correlation of the training data sequence with the error values; and
adjusting at least one of the target values in response to the gradient,
wherein the control circuitry is operable to compute the gradient in response to an error event of the sequence detector convolved with the target values of the target response.

2. The disk drive as recited in claim 1, wherein the control circuitry is operable to compute the gradient by scaling the correlation with at least one of the target values of the target response.

3. The disk drive as recited in claim 1, wherein the error event comprises a '+' error event.

4. The disk drive as recited in claim 1, wherein the control circuitry is operable to compute the gradient by minimizing:

$$e_{y}^{iT} R^z e_{y}^{i}$$

where:
$e_{y}^{i}$ represents the error event convolved with the target values of the target response; and
$R^z$ is a noise correlation matrix.

5. The disk drive as recited in claim 1, wherein the control circuitry is operable to compute the gradient according to:

$$\Delta_{gn} = e_{k-n} \sum_{i=0}^{V-1} g_i e_{k-i} - \sum_{i=0}^{V-1} \sum_{j=0}^{V-1} g_i g_j e_{k-i} a_{k-j-n}$$

where:
$a_k$ is a predetermined data sequence;
the target response comprises V target values $g_0$-$g_{V-1}$;
$e_k$ are the error values; and
$\Delta_{gn}$ is a gradient for the $g_n$ target value.

6. The disk drive as recited in claim 5, wherein the control circuitry does not adjust at least one of the target values.

7. The disk drive as recited in claim 6, wherein the control circuitry does not adjust the first target value $g_0$.

8. A method of operating a disk drive, the disk drive comprising a disk, a head actuated radially over the disk, the head operable to generate a read signal when reading a training data sequence recorded on the disk, a sampling device operable to sample the read signal to generate a sequence of read signal samples, an equalizer comprising a plurality of coefficients, the equalizer operable to equalize the read signal samples to generate a sequence of equalized samples, a sequence detector for detecting an estimated data sequence from the equalized samples, wherein the sequence detector operates according to a target response comprising a plurality of target values, the method comprising:
computing error values in response to a difference between expected samples and the equalized samples;
computing a gradient in response to a correlation of the training data sequence with the error values; and
adjusting at least one of the target values in response to the gradient, wherein:
the gradient is computed in response to an error event of the sequence detector convolved with the target values of the target response.

9. The method as recited in claim 8, wherein the gradient is computed by scaling the correlation with at least one of the target values of the target response.

10. The method as recited in claim 8, wherein the error event comprises a '+' error event.

11. The method as recited in claim 8, wherein the gradient is computed by minimizing:

$$e_{y}^{iT} R^z e_{y}^{i}$$

where:
$e_{y}^{i}$ represents the error event convolved with the target values of the target response; and
$R^z$ is a noise correlation matrix.

12. The method as recited in claim 8, wherein the gradient is computed according to:

$$\Delta_{gn} = e_{k-n} \sum_{i=0}^{V-1} g_i e_{k-i} - \sum_{i=0}^{V-1} \sum_{j=0}^{V-1} g_i g_j e_{k-i} a_{k-j-n}$$

where:
- $a_k$ is a predetermined data sequence;
- the target response comprises V target values $g_0$-$g_{V-1}$;
- $e_k$ are the error values; and
- $\Delta_{g_n}$ is a gradient for the $g_n$ target value.

13. The method as recited in claim 12, wherein at least one of the target values is not adjusted.

14. The method as recited in claim 13, wherein the first target value $g_0$ is not adjusted.

* * * * *